United States Patent Office 2,758,749
Patented Aug. 14, 1956

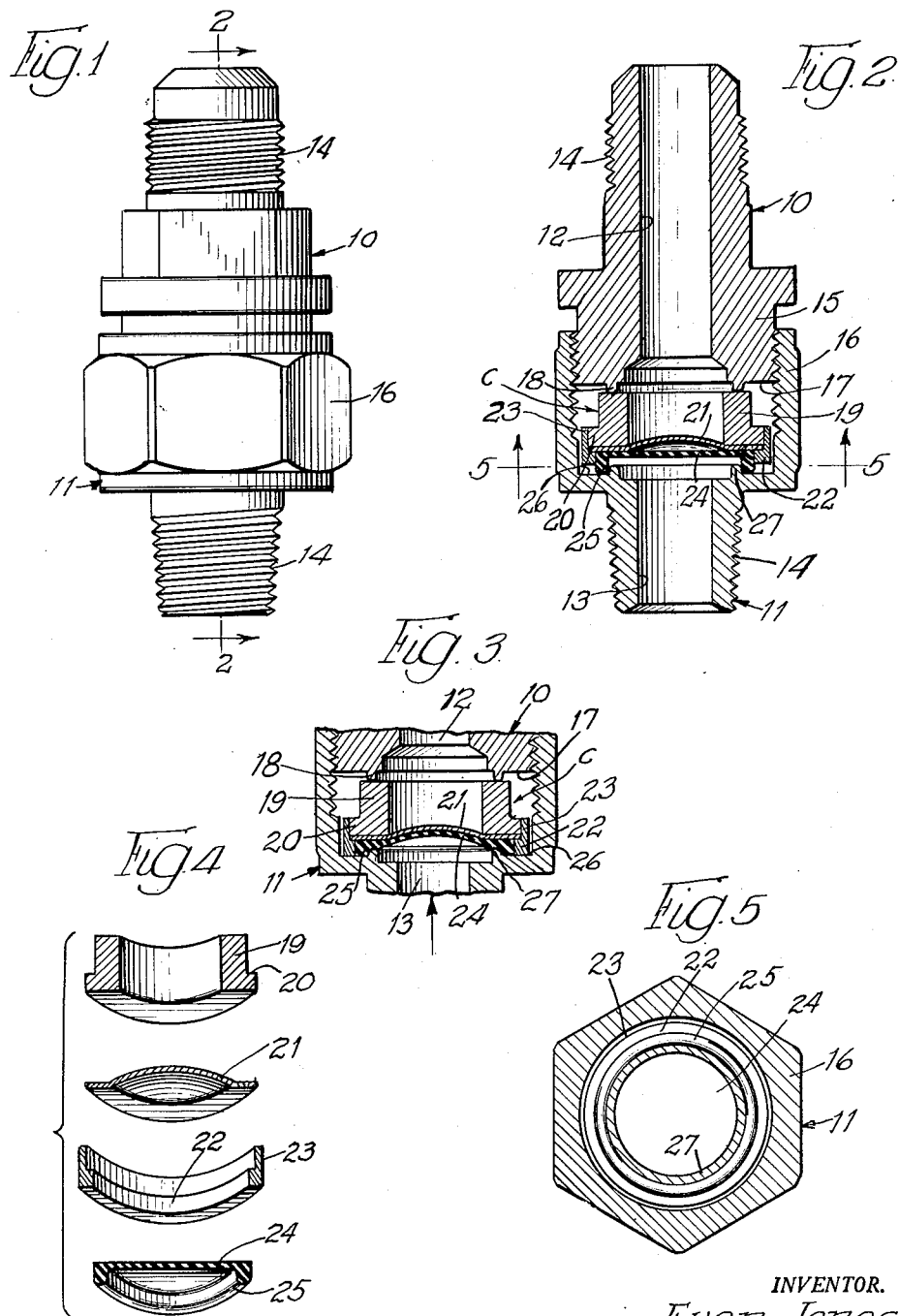

2,758,749

RUPTURE DISK ASSEMBLY

Evan Jones, Evanston, Ill., assignor to Henry Valve Company, Incorporated, Melrose Park, Ill., a corporation of Illinois Application February 2, 1952, Serial No. 269,639

11 Claims. (Cl. 220—89)

The present invention relates to improvements in a rupture disk assembly designed to safeguard a fluid handling system consequent to a condition of excess pressure in the system.

It is a general object of the invention to provide a rupture disk unit of the foregoing character which embodies a pair of diaphragms of different character, one inherently permeable by gas or other fluid handled by the system and the other impermeable thereby, together with means to assemble these diaphragms in a novel and improved manner in operative relation to a pair of coacting fittings, thus to constitute a unit which is highly efficient in operation and proof against both external leakage and internal seepage of fluid from the system under a pressure below the critical pressure for which the unit is designed.

More specifically, it is an object of the invention to provide a rupture disk unit in which a very thin metallic diaphragm, preferably of a silver composition inherently slightly pervious or permeable and subject to seepage therethrough of a fluid restrained thereby, and a further non-metallic, preferably rubber-like diaphragm associated in side-by-side relation to the first named diaphragm to prevent such seepage, said further diaphragm being formed in an improved outline adapting the same to serve the purpose noted and also to act as an O-ring sealing the unit as a whole against leakage externally of the assembled parts thereof.

A further specific object of the invention is to provide a rupture disk unit of the sort referred to above which is made up of a pair of coacting, threadedly associated fittings, and a rupture disk assembly mounted between said fittings, this assembly being preferably a cartridge type in which a thin, readily rupturable metallic disk or diaphragm and a coacting, relatively impermeable, non-metallic protective diaphragm are associated; a pair of coacting mounting members by which they are held in proper position relative to the fittings, the protective diaphragm acting to prevent seepage of liquid through the inherently permeable metallic diaphragm, and also being provided with an integral peripheral sealing bead of substantial size which is compressed between the fittings and acts as an O-ring to prevent radial leakage of the fluid handled.

Yet another object of the invention is to provide an improved rupturable disk cartridge including a pair of axially telescoped annular mounting members; a relatively thin, readily rupturable metallic diaphragm clamped rigidly at its periphery between these members, and an auxiliary protective diaphragm nestingly associated with and centered by one of the members in side-by-side relation to the metallic diaphragm, to thus prevent liquid seepage through the inherently porous material of the latter, the impervious diaphragm being formed with an integral annular bead of the sort referred to in the preceding paragraph.

A still further object is to provide a rupture disk unit embodying a cartridge as described in the preceding paragraph and comprising coacting, threadedly associated tubular fittings, one of which is engageable with the O-ring bead of the protective diaphragm to compress the same, the last named fitting having an axially projecting annular rim or shoulder which coacts with a mounting member of the cartridge in defining what is, in effect, a groove receiving and radially restraining the protective diaphragm bead.

It is a still further object to provide an improved beaded sealing and protective diaphragm of the type described above.

The foregoing statements are indicative in a general way of the nature of the invention. Other and more specific objects will be apparent to those skilled in the art upon a full understanding of the construction and operation of the device.

A single embodiment of the invention is presented herein for purpose of illustration. The invention may also be incorporated in other modified forms coming equally within the scope of the appended claims.

In the drawings,

Fig. 1 is a view in side elevation of the rupture disk unit of the invention in the fully assembled condition of the latter;

Fig. 2 is a view in longitudinal axial section through the unit, illustrating the various components in a nut quite fully clamped condition;

Fig. 3 is a fragmentary view similar to Fig. 2, showing the unit as fully assembled and drawn up to a diaphragm clamping condition;

Fig. 4 is an exploded view in longitudinal section through component parts of an improved rupture disk cartridge having a protective diaphragm associated therewith; and Fig. 5 is a view in transverse horizontal section on line 5—5 of Fig. 2.

The improved rupture disk construction comprises a pair of axially aligned, tubular fittings 10, 11 having internal passages or bores 12, 13, respectively, which are coaxial with one another in the assembled condition of the fitting. Each of these fittings is threaded at 14 for mounting in a fluid handling line and is equipped with external flats to receive a wrench or other tool in assembling the unit. Fitting 10 is enlarged to form a lower body 15 and is externally threaded here. The coacting fitting 11 is provided with an annular, axially extending wall or flange 16 of substantial length which is internally threaded to receive the thread on fitting body 15.

The bottom face 17 of fitting 10 is provided with a small annular, axially extending rim or shoulder 18 in radially inwardly spaced relation to its periphery, which shoulder is axially abutted by the annular body portion 19 of a circular diaphragm cartridge C. The cartridge body is slightly flanged outwardly at 20 on its lower portion. A rupture disk or diaphragm 21 of the same diameter as shoulder 20 is disposed across the latter, and is fixedly clamped against said shoulder by the inwardly overhanging flange 22 of a clamping ring 23. This ring is of the same internal diameter as shoulder 20, and it is force fitted over the latter to provide a disposable diaphragm cartridge. Cartridges of this description may be furnished in different pressure ratings of the diaphragm 21 thereof, for installation in systems calling for different critical rupture pressures.

Diaphragm 21 is preferably formed from a silver solder composition, which furnishes desired rupturing characteristic. However, this material is inherently somewhat porous and fluid permeable in nature; subject to continual seepage of a liquid therethrough. In order to overcome this drawback, I provide an auxiliary diaphragm 24 of thin, wafer-like sort and of non-pervious, impermeable material, for example, rubber, synthetic rubber, or the like. The over-all diameter of this auxiliary protective diaphragm equals the internal diameter of the clamp ring flange 22, so that the diaphragm 24 is snugly nested within the latter in assembled position. Furthermore, diaphragm 24 is provided with an outer annular bead 25 of substantial thickness, which bead extends substantially in the axial direction from the lower side of the diaphragm, i. e., substantially beyond the lower face of clamp ring 22, when the bead is not compressed, as shown in Fig. 2. It is substantially compressed and flattened against an upwardly facing surface of fitting 11 when the two fittings 10, 11 are tightly drawn together, a condition shown in Fig. 3. The extent of this compression is determined by actual axial engagement of the fittings, as will be described.

The upper surface 26 of the fitting 11, within the wall 16 thereof, is provided with an annular, axially extending lip 27 in surrounding relation to the bore 13 of the fitting. The diameter of the lip 27 is approximately equal to the internal diameter of diaphragm bead 25, so that the latter may be readily nested over and centered on the lip, the fittings 10, 11 being thereafter threaded onto this sub-assembly.

In the finally compressed condition of the fitting parts (Fig. 3) the lip 27 and clamp ring shoulder 22 become axially overlapped or telescoped and define a groove receiving and radially restraining the O-ring which is constituted by bead 25. The latter fills the entirety of this groove when compressed, thus contributing additionally to the efficiency of its sealing action.

As illustrated in Fig. 3, engagement of cartridge clamp shoulder 22 with fitting face 26 determines the maximum compression of the bead. The parts are shown under pressure in Fig. 3. Added to the anti-seep action of the remainder of diaphragm 24, it is seen that perfect insurance against loss of fluid below the critical rupture pressure is provided by the O-ring bead of the present unit.

I claim:

1. A rupture disk unit comprising a pair of coacting tubular fittings having the bores thereof in axial alignment, means to secure said fittings in fixed, coaxial relation to one another, a uniformly thin, readily rupturable diaphragm of relatively fluid-pervious material clamped between said fittings and disposed across the axis of said fittings, and a resilient non-metallic protective diaphragm of relative fluid-impervious material associated in side-by-side relation with said first named diaphragm and compressed therewith between said fittings, said protective diaphragm being provided with an annular external bead which is compressed and deformed between one of said fittings and said first named diaphragm.

2. A rupture disk unit comprising a pair of coacting tubular fittings having the bores thereof in axial alignment, means to secure said fittings in fixed, coaxial relation to one another, a uniformly thin, readily rupturable metallic diaphragm of relatively fluid-pervious material disposed across the fitting bores, a protective diaphragm of non-metallic, fluid impermeable material associated in side-by-side relation with said first named diaphragm and clamped with the latter between said fittings, said protective diaphragm being provided with an annular external bead which is compressed and deformed between one of said fittings and said first named diaphragm, and an annular element on said last named fitting centering said protective diaphragm.

3. A rupture disk unit comprising a pair of coacting tubular fittings having the bores thereof in axial alignment, means to secure said fittings in fixed, coaxial relation to one another, a thin, readily rupturable metallic diaphragm of relatively fluid-pervious material disposed across the fitting bores, a protective diaphragm of non-metallic, fluid impermeable material associated in side-by-side relation with said first named diaphragm and disposed with the latter between said fittings, said protective diaphragm being provided with an annular external bead which is compressed and deformed between one of said fittings and said first named diaphragm, an annular element on said last named fitting centering said protective diaphragm, and a further annular element disposed in opposed relation to said first named element and coacting therewith to define a groove receiving said diaphragm bead.

4. A rupture disk unit comprising a pair of axially aligned tubular fittings, an annular rupture disk cartridge distinct from and axially aligned with and clamped between said fittings to extend across the bore thereof, said cartridge including a thin readily rupturable metallic diaphragm and a pair of mounting rings peripherally clamping the diaphragm therebetween, and a protective diaphragm of relatively fluid impermeable, non-metallic elastically deformable material disposed in side-by-side relation to said first named diaphragm, said protective diaphragm having an axially extending peripheral bead of substantial thickness which is compressed and deformed substantially between said cartridge and one of said fittings.

5. A rupture disk unit comprising a pair of axially aligned tubular fittings, an annular rupture disk cartridge distinct from and axially aligned with and clamped between said fittings to extend across the bore thereof, said cartridge including a thin readily rupturable metallic diaphragm and a pair of mounting rings peripherally clamping the diaphragm therebetween, and a protective diaphragm of relatively fluid impermeable, non-metallic material disposed in side-by-side relation to said first named diaphragm, said protective diaphragm having an axially extending peripheral bead of substantial thickness which is compressed and deformed substantially between said cartridge and one of said fittings, said cartridge having an annular formation nestingly engaging said bead to center the same.

6. A rupture disk unit comprising a pair of axially aligned tubular fittings, an annular rupture disk cartridge distinct from and axially aligned with and clamped between said fittings to extend across the bore thereof, said cartridge including a thin readily rupturable metallic diaphragm and a pair of mounting rings peripherally clamping the diaphragm therebetween, and a protective diaphragm of relatively fluid impermeable, non-metallic material disposed in side-by-side relation to said first named diaphragm, said protective diaphragm having an axially extending peripheral bead of substantial thickness which is compressed and deformed substantially between said cartridge and one of said fittings, one of said fittings and said cartridge having oppositely facing annular formations nestingly engaging said bead to center the same.

7. A rupture disk unit comprising a pair of coacting tubular fittings having the bores thereof in axial alignment, means to secure said fittings in fixed, coaxial relation to one another, a thin, readily rupturable metallic diaphragm of relatively fluid-pervious material disposed across the fitting bores, a protective diaphragm of non-metallic, fluid impermeable material associated in side-by-side relation with said first named diaphragm and disposed with the latter between said fittings, said protective diaphragm being provided with an annular external bead which is compressed and deformed between one of said fittings and said first named diaphragm, an annular element on said first named fitting centering said protective diaphragm, and a further annular element disposed in opposed relation to said first named element and coacting therewith to define a groove receiving said diaphragm bead, said further element and first named fitting having rigid axial engagement with one another to limit compression of said bead.

8. A rupture disk unit comprising a pair of axially aligned tubular fittings, an annular rupture disk cartridge distinct from and axially aligned with and clamped between said fittings to extend across the bore thereof, said cartridge including a thin readily rupturable metallic diaphragm and a pair of mounting rings peripherally clamping the diaphragm therebetween, and a protective diaphragm of relatively fluid impermeable, non-metallic elastically deformable material disposed in side-by-side relation to said first named diaphragm, said protective diaphragm having an axially extending peripheral bead of substantial thickness which is compressed and deformed substantially between said cartridge and one of said fittings, said fittings and cartridge having rigid axial engagement with one another and limiting compression of said bead.

9. A rupture disk unit comprising a pair of coacting tubular fittings having the bores thereof in axial alignment, means to secure said fittings in fixed, coaxial relation to one another, a thin, readily rupturable metallic diaphragm of relatively fluid-pervious material disposed across the fitting bores, a protective diaphragm of non-metallic, fluid impermeable material associated in side-by-side relation with said first named diaphragm and disposed with the latter between said fittings, said protective diaphragm being provided with an annular external bead which is compressed and deformed between one of said fittings and said first named diaphragm, an annular element on said first named fitting centering said protective diaphragm, and a further annular element disposed in opposed relation to said first named element and coacting therewith to define a groove receiving said diaphragm bead, said further and first named elements having rigid axial engagement within one another to limit compression of said bead.

10. A rupture disk cartridge including a pair of clamping rings secured in fixed relation with one another, the first of said clamping rings being provided with a flat end surface, the second of said rings being formed from integral axially and radially inwardly extending flanges to define therebetween about the inner periphery of said second ring an inwardly directed shoulder, the axially extending flange portion of said second ring frictionally engaging the outer periphery of said first ring, a rupturable diaphragm of relatively fluid-permeable material peripherally clamped between the end surface of said first ring and the shoulder of said second ring in direct engagement therewith, and a protective diaphragm of relatively fluid-impermeable material aligned with said rupturable diaphragm and centered by the inner periphery of the radially inwardly directed flange of said second ring.

11. A rupture disk cartridge including a pair of clamping rings secured in fixed relation with one another, the first of said clamping rings being provided with a flat end surface, the second of said rings being formed from integral axially and radially inwardly extending flanges to define therebetween about the inner periphery of said second ring an inwardly directed shoulder, the axially extending flange portion of said second ring frictionally engaging the outer periphery of said first ring, a rupturable diaphragm of relatively fluid-permeable material peripherally clamped between the end surface of said first ring and the shoulder of said second ring, and a protective diaphragm of relatively fluid-impermeable material aligned with said rupturable diaphragm and centered by the inner periphery of the radially inwardly directed flange of said second ring, said protective diaphragm being provided with an axially extending outer peripheral bead having at least a portion thereof in contact with the inner periphery of said radially inwardly directed flange of said second ring.

References Cited in the file of this patent

UNITED STATES PATENTS

| | | |
|---|---|---|
| 785,116 | Perry | Mar. 21, 1905 |
| 1,951,897 | Binckley | Mar. 20, 1934 |
| 2,169,123 | Galusha | Aug. 8, 1939 |
| 2,178,178 | McKeever | Oct. 31, 1939 |
| 2,194,159 | Bonyun et al. | Mar. 19, 1940 |
| 2,283,439 | Herman | May 19, 1942 |
| 2,370,870 | McKeague | Mar. 6, 1945 |
| 2,437,836 | Santiago | Mar. 16, 1948 |
| 2,548,298 | Simons | Apr. 10, 1951 |
| 2,564,171 | Page | Aug. 14, 1951 |
| 2,576,431 | White | Nov. 27, 1951 |
| 2,681,742 | Miller | June 22, 1954 |